US008100751B2

(12) United States Patent
Jackson

(10) Patent No.: US 8,100,751 B2

(45) **Date of Patent: *Jan. 24, 2012**

(54) HORSESHOE PAYLINE SYSTEM AND GAMES USING THAT SYSTEM

(75) Inventor: Kathleen Nylund Jackson, Scituate, MA (US)

(73) Assignee: IGT, Reno, NV (US)

( * ) Notice: Subject to any disclaimer, the term of this patent is extended or adjusted under 35 U.S.C. 154(b) by 874 days.

This patent is subject to a terminal disclaimer.

(21) Appl. No.: 12/019,414

(22) Filed: Jan. 24, 2008

(65) Prior Publication Data

US 2008/0161096 A1 Jul. 3, 2008

Related U.S. Application Data

(63) Continuation of application No. 10/925,879, filed on Aug. 25, 2004, now Pat. No. 7,393,277.

(60) Provisional application No. 60/497,658, filed on Aug. 25, 2003.

(51) Int. Cl.
*A63F 13/00* (2006.01)

(52) U.S. Cl. .......................................................... 463/20

(58) Field of Classification Search ..................... 463/20
See application file for complete search history.

(56) References Cited

U.S. PATENT DOCUMENTS

| | | | |
|---|---|---|---|
| 4,198,052 | A | 4/1980 | Gauselmann |
| D261,782 | S | 11/1981 | Muir |
| 4,448,419 | A | 5/1984 | Telnaes |
| 4,618,150 | A | 10/1986 | Kimura |
| 4,624,459 | A | 11/1986 | Kaufman |
| 4,695,053 | A | 9/1987 | Vazquez, Jr. et al. |
| 4,732,386 | A | 3/1988 | Rayfiel |
| 4,756,531 | A | 7/1988 | DiRe et al. |
| 4,826,169 | A | 5/1989 | Bessho et al. |
| 4,838,552 | A | 6/1989 | Hagiwara |

(Continued)

FOREIGN PATENT DOCUMENTS

| | | |
|---|---|---|
| EP | 0 060 019 | 9/1982 |

(Continued)

*Primary Examiner* — Dmitry Suhol
*Assistant Examiner* — Malina K Rustemeyer
(74) *Attorney, Agent, or Firm* — K&L Gates LLP

(57) ABSTRACT

A pay line system has a novel type of pay line that can be provided in a variety of different display systems, including at least 3×3 reel-type displays, 3×4, 4×3, 3×5, 5×3, 4×5 and 5×4 displays. The pay lines are preferably displayed on 3×5 or 5×3 window formats and comprise "horseshoe" arrays of frames or H-Configuration arrays of frames. The horseshoe arrays may be provided with the horseshoe opening at 0°, 90°, 180°, 270° with respect to vertical on the screen or with respect to the vertical orientation of a column, and the horseshoe may have three adjacent frames parallel to three of the four sides of the rectangular display created by the columns and rows. In a 3×5 display format, this allows for the horseshoe pay lines to provide twelve new pay lines and six H-Configuration pay lines. These new 7-symbol pay lines may be in addition to other pay lines or as alternatives to other pay lines. The preferred pay line is a series of three lines of equal dimensions (e.g., three frames along each line) in which only one line is a connecting perpendicular to two lines and only two lines are parallel to each other (forming a horseshoe or U-shape, or forming an H-shape). The pay lines may be numbered and any winning amounts could be multiplied by the value of the number of the winning pay line.

44 Claims, 17 Drawing Sheets

U.S. PATENT DOCUMENTS 4,874,173 A 10/1989 Kishishita
4,991,848 A 2/1991 Greenwood et al.
5,019,973 A 5/1991 Wilcox et al.
5,085,436 A 2/1992 Bennett
5,102,134 A 4/1992 Smyth
5,102,137 A 4/1992 Ekiert
5,209,479 A 5/1993 Nagao et al.
5,308,065 A 5/1994 Bridgeman et al.
5,332,228 A 7/1994 Schultz
5,342,047 A 8/1994 Heidel et al.
5,344,144 A 9/1994 Canon
5,393,061 A 2/1995 Manship et al.
5,395,111 A 3/1995 Inoue
5,423,539 A 6/1995 Nagao
5,431,408 A 7/1995 Adams
5,449,173 A 9/1995 Thomas et al.
5,542,669 A 8/1996 Charron et al.
5,569,084 A 10/1996 Nicastro et al.
5,580,053 A 12/1996 Crouch
5,580,055 A 12/1996 Hagiwara
5,584,764 A 12/1996 Inoue
5,609,524 A 3/1997 Inoue
5,611,535 A 3/1997 Tiberio
5,697,843 A 12/1997 Manship et al.
5,704,835 A 1/1998 Dietz, II
5,722,891 A 3/1998 Inoue
5,752,881 A 5/1998 Inoue
5,766,074 A 6/1998 Cannon et al.
5,769,716 A 6/1998 Saffari et al.
5,772,509 A 6/1998 Weiss
5,775,692 A 7/1998 Watts et al.
5,788,573 A 8/1998 Baerlocher et al.
5,807,172 A 9/1998 Piechowiak
5,810,361 A 9/1998 Kadlic
5,823,873 A 10/1998 Moody
5,823,874 A 10/1998 Adams
5,833,536 A 11/1998 Davids et al.
5,833,537 A 11/1998 Barrie
5,848,932 A 12/1998 Adams
5,851,148 A 12/1998 Brune et al.
5,882,259 A 3/1999 Holmes, Jr. et al.
5,882,261 A 3/1999 Adams
5,890,962 A 4/1999 Takemoto
5,902,184 A 5/1999 Bennett et al.
5,919,088 A 7/1999 Weiss
5,927,714 A 7/1999 Kaplan
5,947,820 A 9/1999 Morro et al.
5,951,397 A 9/1999 Dickinson
5,957,774 A 9/1999 Holmes, Jr. et al.
5,976,016 A 11/1999 Moody et al.
5,980,384 A 11/1999 Barrie
5,984,781 A 11/1999 Sunaga
5,984,782 A 11/1999 Inoue
5,997,400 A 12/1999 Seelig et al.
5,997,401 A 12/1999 Crawford
6,004,207 A 12/1999 Wilson, Jr. et al.
6,004,208 A 12/1999 Takemoto et al.
6,015,346 A 1/2000 Bennett
6,027,115 A 2/2000 Griswold et al.
6,033,307 A 3/2000 Vancura
6,056,642 A 5/2000 Bennett
6,059,289 A 5/2000 Vancura
6,059,658 A 5/2000 Mangano et al.
6,062,980 A 5/2000 Luciano
6,068,552 A 5/2000 Walker et al.
6,089,976 A 7/2000 Schneider et al.
6,089,977 A 7/2000 Bennett
6,089,978 A 7/2000 Adams
6,093,102 A * 7/2000 Bennett .......................... 463/20
6,095,921 A 8/2000 Walker et al.
6,102,798 A 8/2000 Bennett
6,113,098 A 9/2000 Adams
6,120,031 A 9/2000 Adams
6,120,377 A 9/2000 McGinnis, Sr. et al.
6,120,378 A 9/2000 Moody
6,123,333 A 9/2000 McGinnis, Sr. et al.
6,126,542 A 10/2000 Fier
6,142,873 A 11/2000 Weiss et al.
6,142,874 A 11/2000 Kodachi et al.
6,142,875 A 11/2000 Kodachi et al.
6,146,273 A 11/2000 Olsen
6,155,925 A 12/2000 Giobbi et al.
6,159,095 A 12/2000 Frohm et al.
6,159,096 A 12/2000 Yoseloff
6,159,097 A 12/2000 Gura
6,159,098 A 12/2000 Slomiany et al.
6,165,070 A 12/2000 Nolte et al.
6,168,520 B1 1/2001 Baerlocher et al.
6,174,233 B1 1/2001 Sunaga et al.
6,186,894 B1 2/2001 Mayeroff
6,190,254 B1 2/2001 Bennett
6,190,255 B1 2/2001 Thomas et al.
6,200,217 B1 3/2001 Osawa
6,203,429 B1 3/2001 Demar et al.
6,203,430 B1 3/2001 Walker et al.
6,220,959 B1 4/2001 Holmes, Jr. et al.
6,224,483 B1 5/2001 Mayeroff
6,227,971 B1 5/2001 Weiss
6,231,442 B1 5/2001 Mayeroff
6,231,445 B1 5/2001 Acres
6,234,897 B1 5/2001 Frohm et al.
6,241,607 B1 6/2001 Payne et al.
6,251,013 B1 6/2001 Bennett
6,261,177 B1 7/2001 Bennett
6,261,178 B1 7/2001 Bennett
6,270,409 B1 8/2001 Shuster
6,270,411 B1 8/2001 Gura et al.
6,270,412 B1 8/2001 Crawford et al.
6,299,165 B1 10/2001 Nagano
6,299,170 B1 10/2001 Yoseloff
6,302,398 B1 10/2001 Vecchio
6,309,299 B1 10/2001 Weiss
6,309,300 B1 10/2001 Glavich
6,311,976 B1 11/2001 Yoseloff et al.
6,315,660 B1 11/2001 DeMar et al.
6,315,663 B1 11/2001 Sakamoto
6,315,664 B1 11/2001 Baerlocher et al.
6,319,124 B1 11/2001 Baerlocher et al.
6,322,078 B1 11/2001 Adams
6,322,445 B1 11/2001 Miller
6,328,649 B1 12/2001 Randall et al.
6,336,860 B1 1/2002 Webb
6,346,043 B1 2/2002 Colin et al.
6,347,996 B1 2/2002 Gilmore et al.
6,358,144 B1 3/2002 Kaddlic et al.
6,358,147 B1 3/2002 Jaffe et al.
6,364,314 B1 4/2002 Canterbury
6,364,766 B1 4/2002 Anderson et al.
6,375,570 B1 4/2002 Poole
6,386,973 B1 5/2002 Yoseloff
6,386,975 B1 5/2002 Peterson
6,394,902 B1 5/2002 Glavich et al.
6,398,218 B1 6/2002 Vancura
6,413,162 B1 7/2002 Baerlocher et al.
6,419,579 B1 7/2002 Bennett
6,439,943 B1 8/2002 Aoki et al.
6,439,993 B1 8/2002 O'Halloran
6,454,266 B1 9/2002 Breeding et al.
6,461,241 B1 10/2002 Webb et al.
6,464,581 B1 10/2002 Yoseloff et al.
6,491,584 B2 12/2002 Graham et al.
6,494,454 B2 12/2002 Adams
6,517,432 B1 2/2003 Jaffe
6,544,120 B2 4/2003 Ainsworth
6,547,242 B1 4/2003 Sugiyama et al.
6,551,187 B1 4/2003 Jaffe
6,558,254 B2 5/2003 Baerlocher et al.
6,561,900 B1 5/2003 Baerlocher et al.
6,602,137 B2 8/2003 Kaminkow et al.
6,604,740 B1 8/2003 Singer et al.
6,604,999 B2 8/2003 Ainsworth
6,605,002 B2 8/2003 Baerlocher
6,609,971 B2 8/2003 Vancura
6,612,574 B1 9/2003 Cole et al.
6,612,575 B1 9/2003 Cole et al.
6,616,142 B2 9/2003 Adams
6,632,139 B1 10/2003 Baerlocher

| | | | | |
|---|---|---|---|---|
| 6,634,945 | B2 | 10/2003 | Glavich et al. | |
| 6,644,664 | B2 | 11/2003 | Muir et al. | |
| 6,652,377 | B1 | 11/2003 | Moody | |
| 6,676,512 | B2 | 1/2004 | Fong et al. | |
| 6,780,111 | B2 | 8/2004 | Cannon et al. | |
| 6,786,818 | B1 | 9/2004 | Rothschild et al. | |
| 6,790,141 | B2 | 9/2004 | Muir | |
| 6,793,578 | B2 | 9/2004 | Luccesi et al. | |
| 6,832,957 | B2 | 12/2004 | Falconer | |
| 6,864,357 | B2 | 3/2005 | Eggen et al. | |
| 6,866,585 | B2 | 3/2005 | Muir | |
| 6,869,357 | B2 * | 3/2005 | Adams et al. | 463/16 |
| 6,875,107 | B1 | 4/2005 | Luciano, Jr. | |
| 6,896,615 | B2 | 5/2005 | Berman | |
| 6,896,617 | B2 | 5/2005 | Daly | |
| 6,905,405 | B2 | 6/2005 | McClintic | |
| 6,905,406 | B2 | 6/2005 | Kaminkow et al. | |
| 6,939,226 | B1 | 9/2005 | Joshi | |
| 6,960,133 | B1 | 11/2005 | Marks et al. | |
| 6,966,835 | B2 | 11/2005 | Graham | |
| 6,974,385 | B2 | 12/2005 | Joshi et al. | |
| 7,001,274 | B2 | 2/2006 | Baerlocher et al. | |
| 7,014,560 | B2 | 3/2006 | Glavich et al. | |
| 7,018,293 | B2 | 3/2006 | Brown et al. | |
| 7,029,395 | B1 | 4/2006 | Baerlocher | |
| 7,052,395 | B2 | 5/2006 | Glavich et al. | |
| 7,056,213 | B2 | 6/2006 | Ching et al. | |
| 7,070,502 | B1 | 7/2006 | Bussick et al. | |
| 7,128,647 | B2 | 10/2006 | Muir | |
| 7,156,736 | B2 | 1/2007 | Adams et al. | |
| 7,160,188 | B2 | 1/2007 | Kaminkow et al. | |
| 7,161,589 | B2 | 1/2007 | Muir | |
| 7,169,042 | B2 | 1/2007 | Muir et al. | |
| 7,192,345 | B2 | 3/2007 | Muir et al. | |
| 2001/0041610 | A1 | 11/2001 | Luciano et al. | |
| 2001/0054794 | A1 | 12/2001 | Cole et al. | |
| 2002/0014740 | A1 | 2/2002 | Ainsworth | |
| 2002/0025844 | A1 | 2/2002 | Casey et al. | |
| 2002/0055382 | A1 | 5/2002 | Meyer | |
| 2002/0065124 | A1 | 5/2002 | Ainsworth | |
| 2002/0090990 | A1 | 7/2002 | Joshi et al. | |
| 2002/0094857 | A1 | 7/2002 | Meyer | |
| 2002/0094862 | A1 | 7/2002 | Inoue | |
| 2003/0013518 | A1 | 1/2003 | Graham | |
| 2003/0017868 | A1 | 1/2003 | Crawford | |
| 2003/0045345 | A1 | 3/2003 | Berman | |
| 2003/0060266 | A1 | 3/2003 | Baerlocher | |
| 2003/0069068 | A1 | 4/2003 | Kaminkow | |
| 2003/0092480 | A1 | 5/2003 | White et al. | |
| 2003/0114215 | A1 | 6/2003 | Adams et al. | |
| 2003/0130030 | A1 | 7/2003 | Delott et al. | |
| 2003/0134673 | A1 | 7/2003 | Moody | |
| 2003/0144053 | A1 | 7/2003 | Michaelson | |
| 2003/0203752 | A1 | 10/2003 | Kaminkow et al. | |
| 2003/0216165 | A1 | 11/2003 | Singer et al. | |
| 2004/0009803 | A1 | 1/2004 | Bennett et al. | |
| 2004/0023714 | A1 | 2/2004 | Asdale | |
| 2004/0048650 | A1 | 3/2004 | Mierau et al. | |
| 2004/0053677 | A1 | 3/2004 | Hughs-Baird | |
| 2004/0058727 | A1 | 3/2004 | Marks et al. | |
| 2004/0077401 | A1 | 4/2004 | Schlottmann | |
| 2004/0077402 | A1 | 4/2004 | Schlottmann | |
| 2004/0097280 | A1 | 5/2004 | Gauselmann | |
| 2004/0166929 | A1 | 8/2004 | Tarantino | |
| 2004/0180714 | A1 | 9/2004 | Ward | |
| 2004/0192431 | A1 | 9/2004 | Singer et al. | |
| 2004/0195773 | A1 | 10/2004 | Musci et al. | |
| 2004/0219968 | A1 | 11/2004 | Fiden et al. | |
| 2004/0242314 | A1 | 12/2004 | Casey | |
| 2005/0054429 | A1 | 3/2005 | Baerlocher et al. | |
| 2005/0059481 | A1 | 3/2005 | Joshi et al. | |
| 2005/0060050 | A1 | 3/2005 | Baerlocher et al. | |
| 2005/0096123 | A1 | 5/2005 | Cregan et al. | |
| 2005/0124404 | A1 | 6/2005 | Nicely | |
| 2005/0124406 | A1 | 6/2005 | Cannon | |
| 2005/0130731 | A1 | 6/2005 | Englman et al. | |
| 2005/0130737 | A1 | 6/2005 | Englman et al. | |
| 2005/0148384 | A1 | 7/2005 | Marks et al. | |
| 2005/0170876 | A1 | 8/2005 | Masci et al. | |
| 2005/0192081 | A1 | 9/2005 | Marks et al. | |
| 2005/0208994 | A1 | 9/2005 | Berman | |
| 2006/0030387 | A1 | 2/2006 | Jackson | |
| 2007/0032291 | A1 | 2/2007 | Marks et al. | |
| 2007/0060289 | A1 | 3/2007 | Hood | |

FOREIGN PATENT DOCUMENTS

| | | |
|---|---|---|
| EP | 0 238 289 | 9/1987 |
| EP | 0 410 789 | 7/1990 |
| EP | 0 984 408 | 3/2000 |
| GB | 2 090 690 | 7/1982 |
| GB | 2 096 376 | 10/1982 |
| GB | 2 097 160 | 10/1982 |
| GB | 2 100 905 | 1/1983 |
| GB | 2 105 891 | 3/1983 |
| GB | 2 117 155 | 10/1983 |
| GB | 2 137 392 | 10/1984 |
| GB | 2 161 008 | 1/1986 |
| GB | 2 170 636 | 8/1986 |
| GB | 2 181 589 | 4/1987 |
| GB | 2 183 882 | 6/1987 |
| GB | 2 191 030 | 12/1987 |
| GB | 2 222 712 | 3/1990 |
| GB | 2 225 889 | 6/1990 |
| GB | 2 226 436 | 6/1990 |
| GB | 2 226 907 | 7/1990 |
| GB | 2 242 300 | 9/1991 |
| GB | 2 262 642 | 6/1993 |
| GB | 2 316 214 | 2/1998 |
| GB | 2 328 311 | 2/1999 |

* cited by examiner

HORSESHOE PAYLINE SYSTEM AND GAMES USING THAT SYSTEM

PRIORITY CLAIM

This application is a continuation application of, claims priority to and the benefit of U.S. patent application Ser. No. 10/925,879 filed on Aug. 25, 2004, which is a non-provisional application of, claims priority to and the benefit of U.S. Provisional Patent Application No. 60/497,658, filed on Aug. 25, 2003, the entire contents of which are both incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

The present invention relates to gaming equipment, especially multi-line and multicolumn wagering displays, particularly reel-type wagering apparatus and displays, and most particularly to the pay lines that are used on such gaming apparatus and displays.

Gaming apparatus where symbols are randomly displayed and predetermined sets of symbols are awarded prizes have been used for entertainment for over one hundred years. These types of systems are generally referred to as slot machines or slot-type machines and the like. These machines had originally been limited to their style and format to the available physical structures that could be used to provide and display the symbols, relying primarily upon the mathematical relationships of a) wagering odds/payouts and the b) statistical distribution of symbols to control the amount of awards provided to players.

Even prior to 1900, machines were available with three reels with symbols provided on each reel at various positions where the reel was allowed to stop spinning (referred to as stop positions in the art), rotating pointers that would identify symbols or awards, rotating racks of cards that would display one card in each of five windows (much like the original digital clocks with each number on a panel), cash machine displays where cards would pop-up just as sales amounts would pop-up in a cash register and spinning wheels that would stop at a pointer. The classic slot machine format of three axially aligned reels having multiple sets of images on each reel became the standard in the industry for many years and still receives the majority of play in today's casinos.

The advent of video gaming technology and touch-screens has advanced the theoretical limits of the types of games and displays that can be used on gaming apparatus. Initially, there was some resistance to the newer video format games, except in the venue of poker-type video games. It has become lore in the industry that the main reason for this is that players wanted the machines to look and act the same as the old machines as a matter of trust in the old gaming apparatus and technical inertia.

Video games are now widely accepted in the industry across many different game styles, from poker games, blackjack, three-reel slots, keno, 3×5 slots (three rows and five columns), bonus events on gaming apparatus and the like. The industry has been slow, however, to take advantage of all the potential opportunities and formats available on gaming apparatus.

U.S. Pat. No. 5,580,053 describes a series of pay lines for use in video gaming. That invention consists in a gaming machine having display means arranged to display a plurality of symbols in an array of a predetermined number of rows and columns of symbol locations, game control means arranged to control images displayed on the display means, the game control means being arranged to pay a prize when a predetermined combination of symbols is displayed on a predetermined line of symbol locations of the array characterized in that the number of possible predetermined lines recognized by the control means is greater than the number of rows plus a number of diagonals of the array, there being at least n+1 lines that use no symbols in at least 1 row, where n is the number of rows.

The downside of many new pay line arrangements is the confusing and unclear definitions of the pay lines. Players may not easily detect a winning combination, and the anticipation of the win is minimized. A new clear, concise shape or pattern is desired.

There is also a desire in the industry for the player to take advantage of all the pay lines available, since playing more pay lines increases the wager. An enticement should be implemented to encourage play of all available pay lines.

It is still desirable in the industry to provide additional formats and variations so that manufacturers can offer the player new games to maintain and stimulate their interest and enjoyment in play. The addition of easily detected pay line shapes and systems will add to the player's enjoyment, anticipation and ultimately more time on the machine.

SUMMARY

A pay line system is provided in which at least one pay line does not extend across all columns in a gaming display. This type of pay line can be provided in a variety of different display systems, including at least 3×3 reel-type displays, 3×4, 4×3, 3×5, 5×3, 4×5 and 5×4 displays. The pay lines are preferably displayed on 3×5 or 5×3 window formats and comprise horseshoe arrays of frames. The horseshoe arrays may be provided with the horseshoe opening at 00, 90 0, 180 0, 2700 with respect to vertical on the screen or with respect to the vertical orientation of a column, and the horseshoe may have three adjacent frames parallel to three of the four sides of the rectangular display created by the columns and rows. In a 3×5 display format, this allows for the horseshoe pay lines to provide twelve new pay lines. These twelve new pay lines may be in addition to other pay lines or as alternatives to other pay lines. The preferred pay line is a series of three lines of equal dimensions (e.g., three frames along each line) in which only one line is a connecting line that is perpendicular to two lines and only two lines are parallel to each other (forming a horseshoe or U-shape, or forming an H-shape).

DETAILED DESCRIPTION

Figure 1:
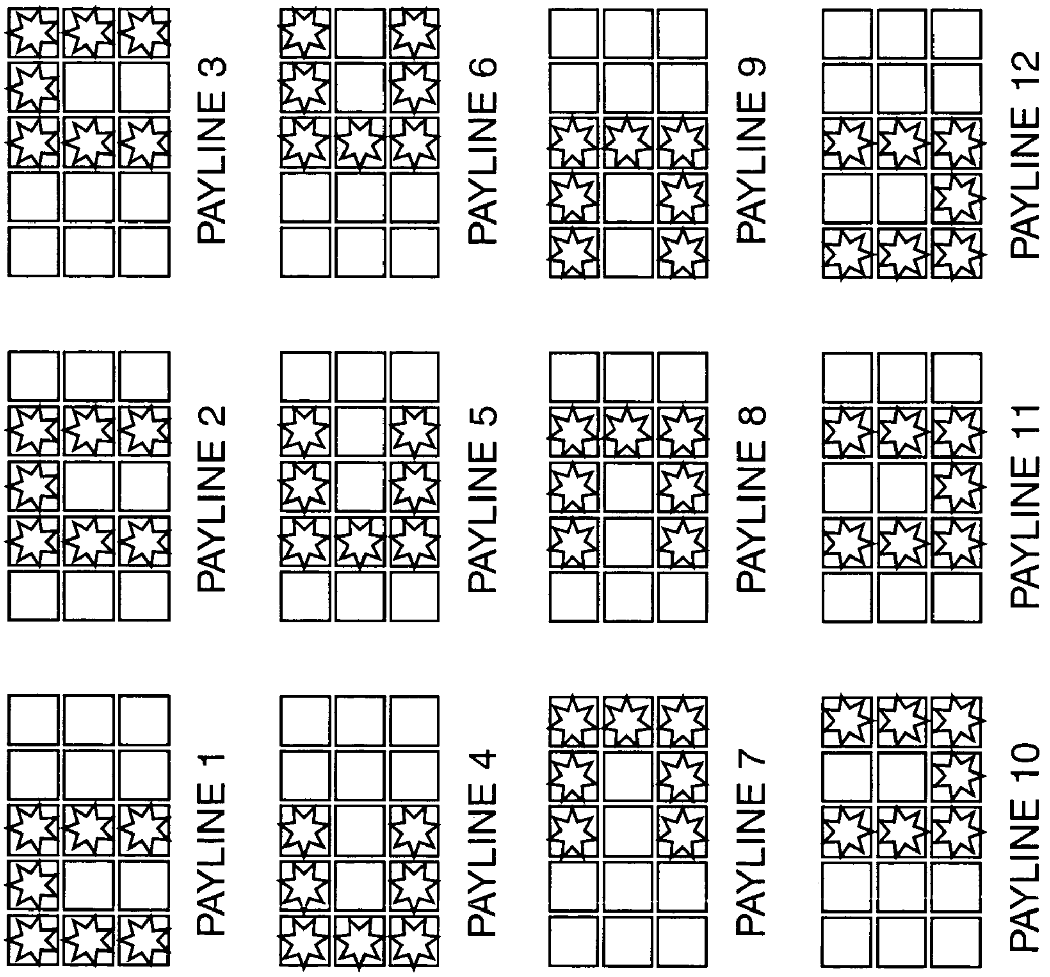
FIG. 1 shows the twelve pay lines available on a 3 (Column)×5 (Row) slot type apparatus.

In addition to game formats, the present invention provides a new format for pay lines that can be used on both a mechanical reel slot machine and a video slot machine 30 wagering system. The system may be used on any size of frame display (e.g., 3×3; 3×4; 4×3; 4×4; 3×5; 5×3; 4×5; and 5×4, but is preferably used in a 3×5 or 5×3 frame array (that is 3 rows and 5 columns or five rows and 3 columns). The preferred pay line is a series of three lines of equal dimensions (e.g., three frames along each line) in which only one line is a connecting perpendicular to two lines and only two lines are parallel to each other (forming a horseshoe or U-shape, or forming an H-shape). Each pay line would consist of 7 symbols. The preferred method of determining wins is assessing symbol combinations from both ends of the horseshoe, allowing for two chances to win on each pay line. Winning symbol combinations may also be determined from one end, both ends, or anywhere on the horseshoe or H-shape itself. One sample of a specific pay line of each of the Horseshoe and H-configuration is shown below on a 3×5 reel display:

| Horseshoe | | |
|---|---|---|
| X | | X |
| X | | X |
| X | X | X |

| H-Configuration | | |
|---|---|---|
| X | | X |
| X | X | X |
| X | | X |

There are fewer available pay lines with the H-configuration because of its symmetry, so the U-Configuration or Horseshoe Configuration is preferred. However, the U-Configuration can be combined with conventional pay lines, unconventional pay lines and/or the Horseshoe Configuration to provide unique pay line displays, visual effects, and game formats.

The pay lines of the invention (both the U-Configuration and/or the H-Configuration) can be used in bonus events also. The symmetry of the pay lines (one way symmetry with the Horseshoe Configuration and two-way symmetry with the H-Configuration) also provides a natural showcase or frame for alphanumeric displays, notices, animation, and the like during the game, while many of the unusual pay lines of the prior art (e.g., as shown in U.S. Pat. No. 5,580,053) are difficult to read, do not always follow a logical reading order, and do not lend themselves to such a framing display.

The games of the present invention and the pay lines of the present invention may be played on mechanical reels or video displays. The visual display may be any image display system, by way of non-limiting examples being CRT displays, plasma displays, Liquid Crystal displays, LED displays, and any other digital or analog display system. The processor system used in the present invention may be a unique game synthesized processor (hardware and software), or the wide range of commercially available and modifiable hardware and software systems on the market (by way of non-limiting examples, PC-based hardware and software, MAC-based hardware and software, LINUX systems, UNIX systems, and any other hardware and software and processors) may be used. Player controls may include buttons, touch-screens, mouse, joy stick, light rod, voice control, roller ball, throttle or any other user interface user-active control known to the computer industry.

The systems of the invention may use value in the play of the games derived from coins, currency, credit cards, ticket-in/ticket-out systems, player control cards, central computerized record systems, or any other acceptable source of value. Various in-machine and machine-external security systems may be available with the systems of the invention such as bio-recognition systems (by way of non-limiting examples, facial recognition, retinal scans, voice recognition, fingerprints, etc.), validation and verification software and hardware for the transmission of data, security cameras, security personnel and the like.

The actual use of the pay lines of the invention in the play of wagering games is further enabled and described by reference to the Figures. Although the examples in the Figures use the preferred mode of a visual display, almost all of the features in that play can be mechanically reproduced in a mechanical reel system, with halo or highlight effects being provided by lighting arrangements or a teleprompter panel or liquid crystal panel over the mechanical reels.

FIG. 1 shows the twelve Horseshoe Configuration pay lines that can be available on a 3 (Column)×5 (Row) slot-type apparatus.

Figure 2:
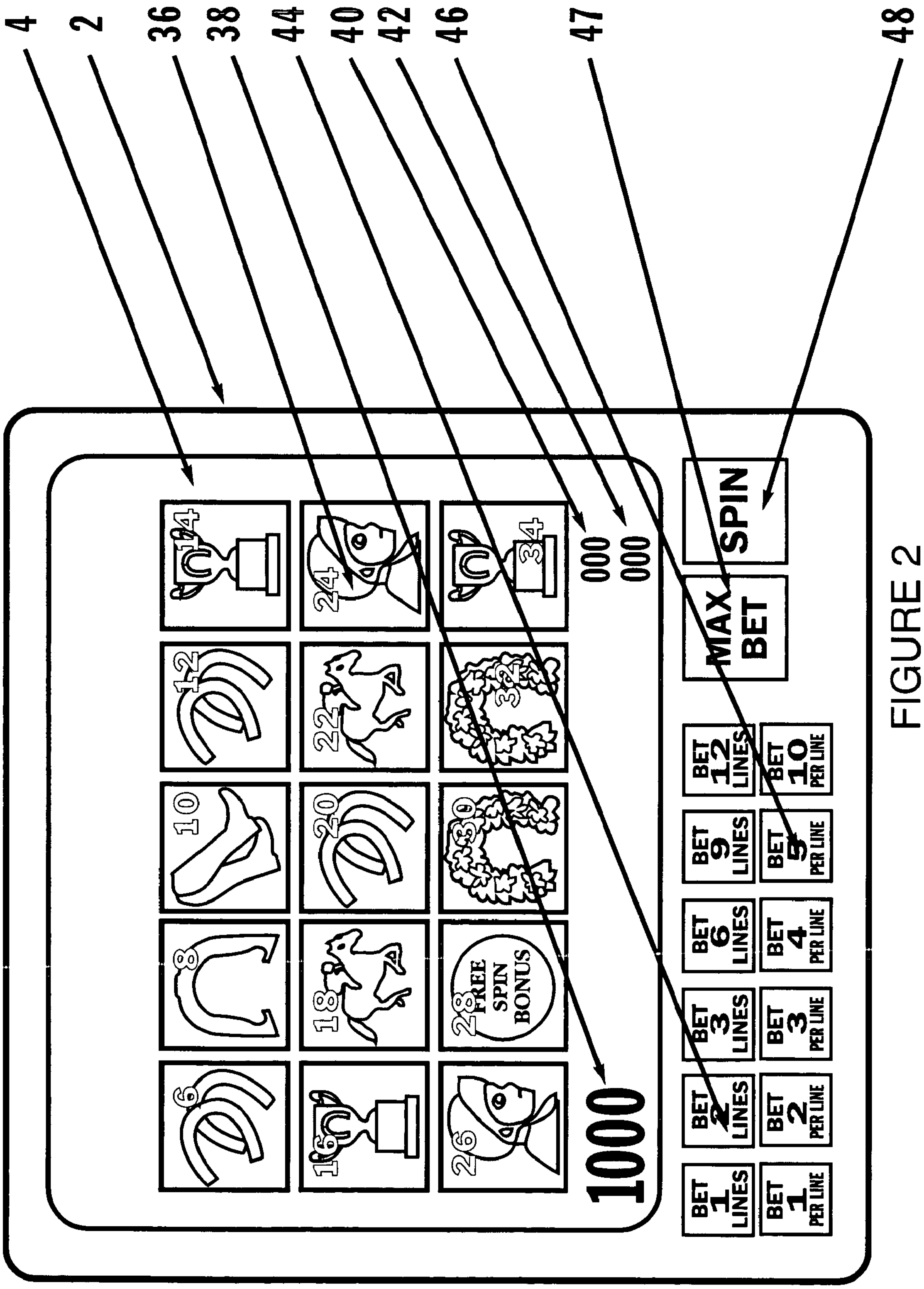
FIG. 2 shows the display screen of a 3×5 format reel-type display on the video gaming equipment at rest.

FIG. 2 shows the display screen 4 of a 3×5 format reel-type display 2 on the video gaming equipment at rest. There are 15 frames shown that are labeled for convenience as frames 6, 8, 10, 12, 14, 16, 18, 20, 22, 24, 26, 28, 30, 32, and 34. The frames may provide their symbol images as visual representation of reels that rotate vertically or horizontally, or the individual frames (e.g., 36) may spin independently in place. The total credits 38, credits bet 40, credits won 42, number of pay lines bet 44, number of credits bet per pay line 46, maximum bet 47 or spin button 48, and any other desired functions may be provided on the apparatus. The existing buttons or touch screen positions may also allow the player to select which of the specific pay lines wagers are desired on, rather then allowing the machine to place the wagers in only specific orders. For example, the series of wagering events can enable not only the selection of how many pay lines can be wagered on, but also which pay lines are to be wagered on. For example, when signaled to Select Pay Lines, a player may elect to select pay lines 1, 5, and 7 from FIG. 1 (alone or in addition to conventional pay lines such as the horizontal pay lines 6-14; 16-24; and 26-34) and select how much to wager on each pay line, although this last would be time consuming.

Figure 3:
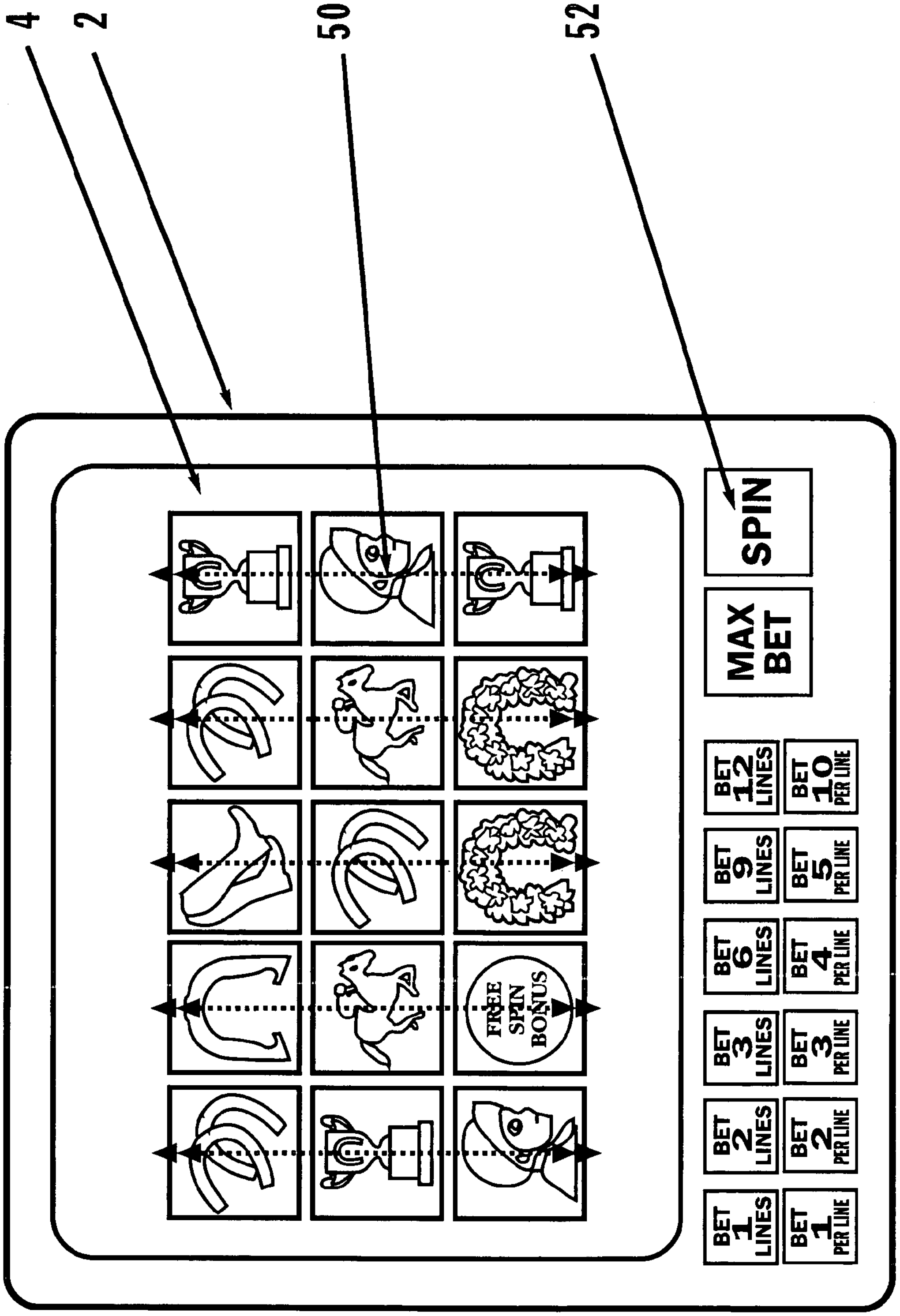
FIG. 3 shows the display screen of video gaming equipment in virtual spinning motion.

FIG. 3 shows the display screen 4 of video gaming equipment 2 in virtual spinning motion 50 after the spin button 52 has been selected.

Figure 4:
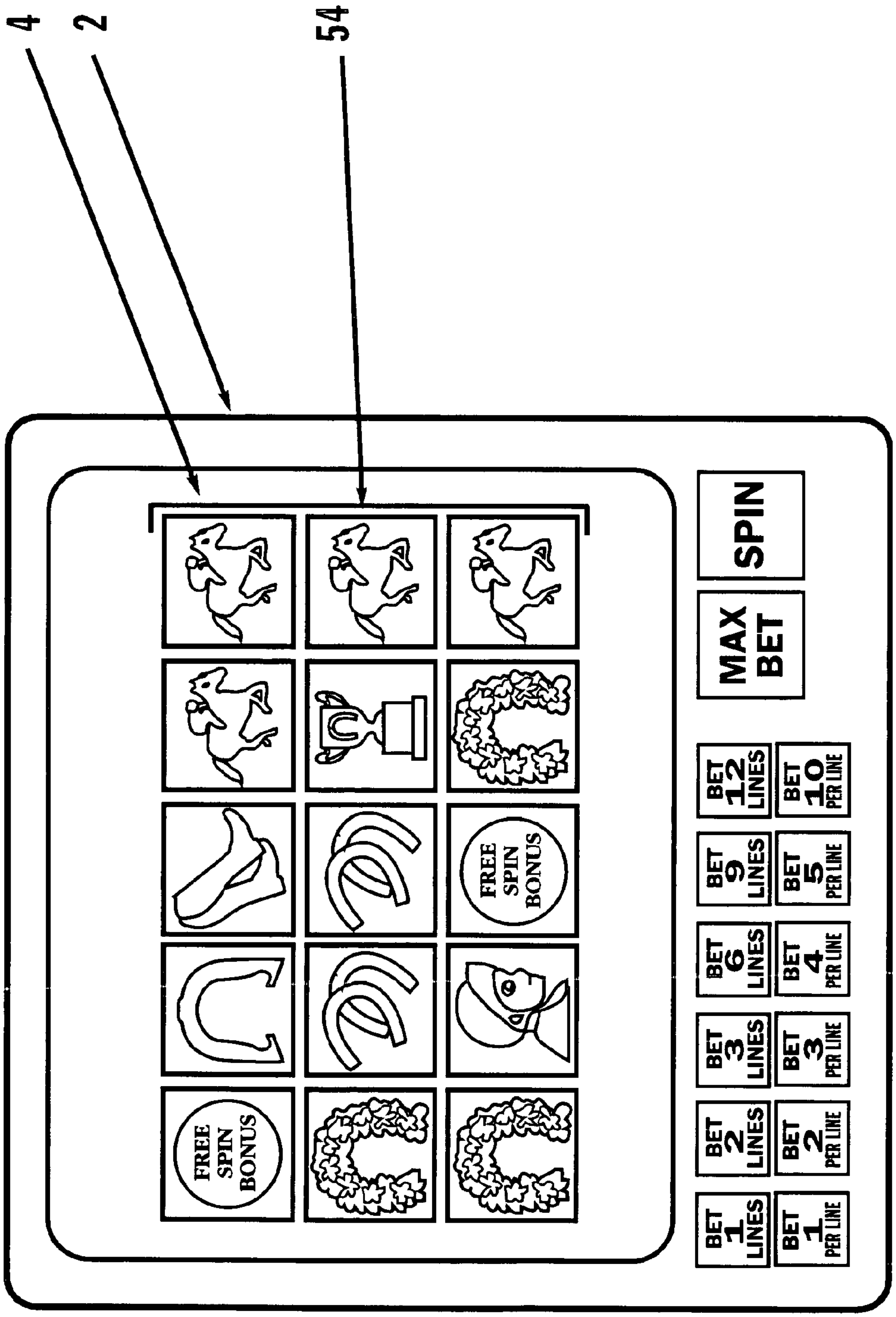
FIG. 4 shows the display screen of video gaming equipment after it has stopped its virtual spin to display a new screen arrangement of symbols.

FIG. 4 shows the display screen 4 of video gaming equipment 2 after it has stopped its virtual spin to display a new screen arrangement 54 of symbols.

Figure 5:
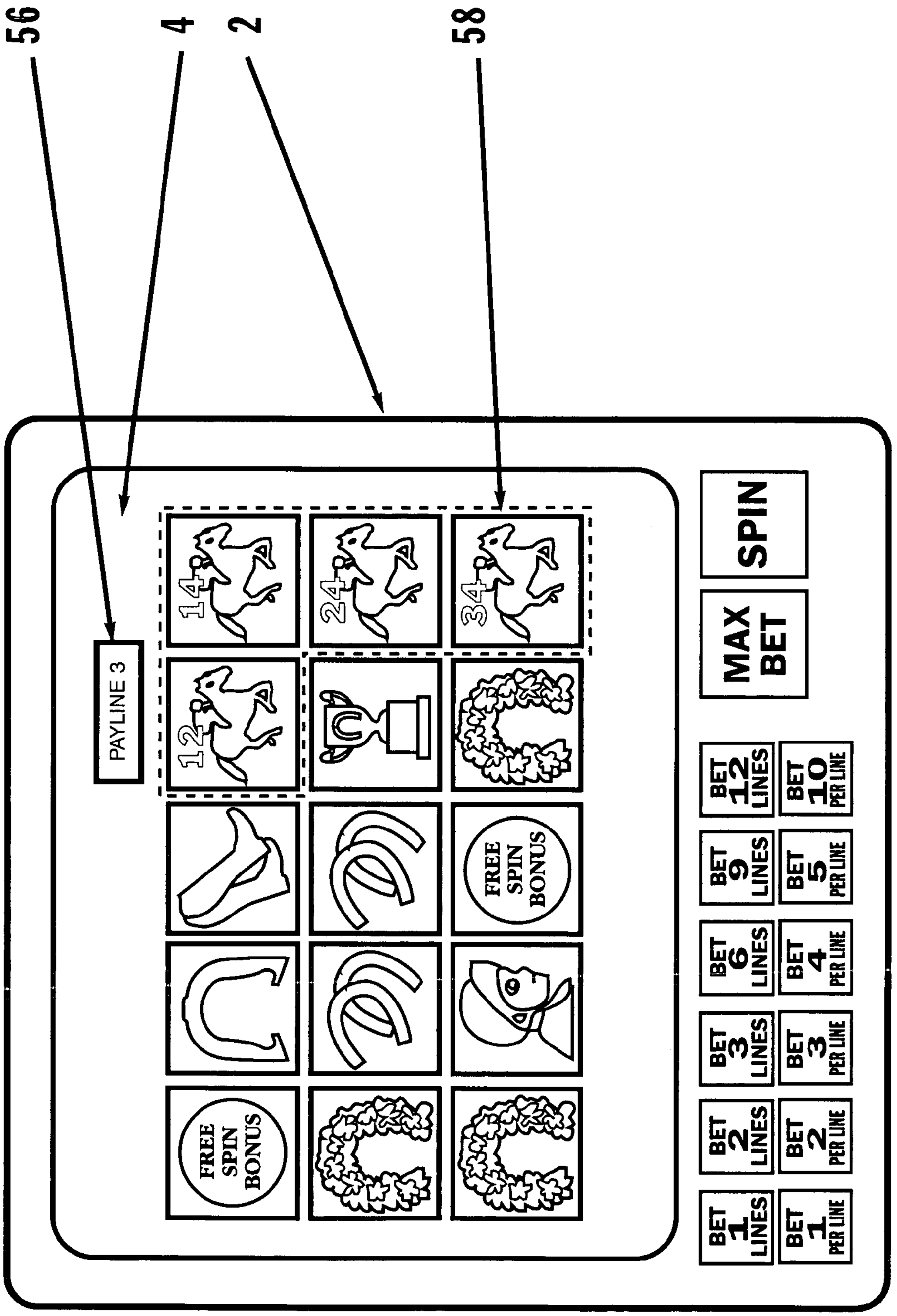
FIG. 5 shows the display screen of video gaming equipment as a particular pay line is evaluated for wins and a winning arrangement of symbols is highlighted.

FIG. 5 shows the display screen 4 of video gaming equipment 2 as a particular pay line 56 is evaluated for wins and a winning arrangement of symbols 12, 14, 24 and 34 is highlighted on the pay line display 58.

Figure 6:
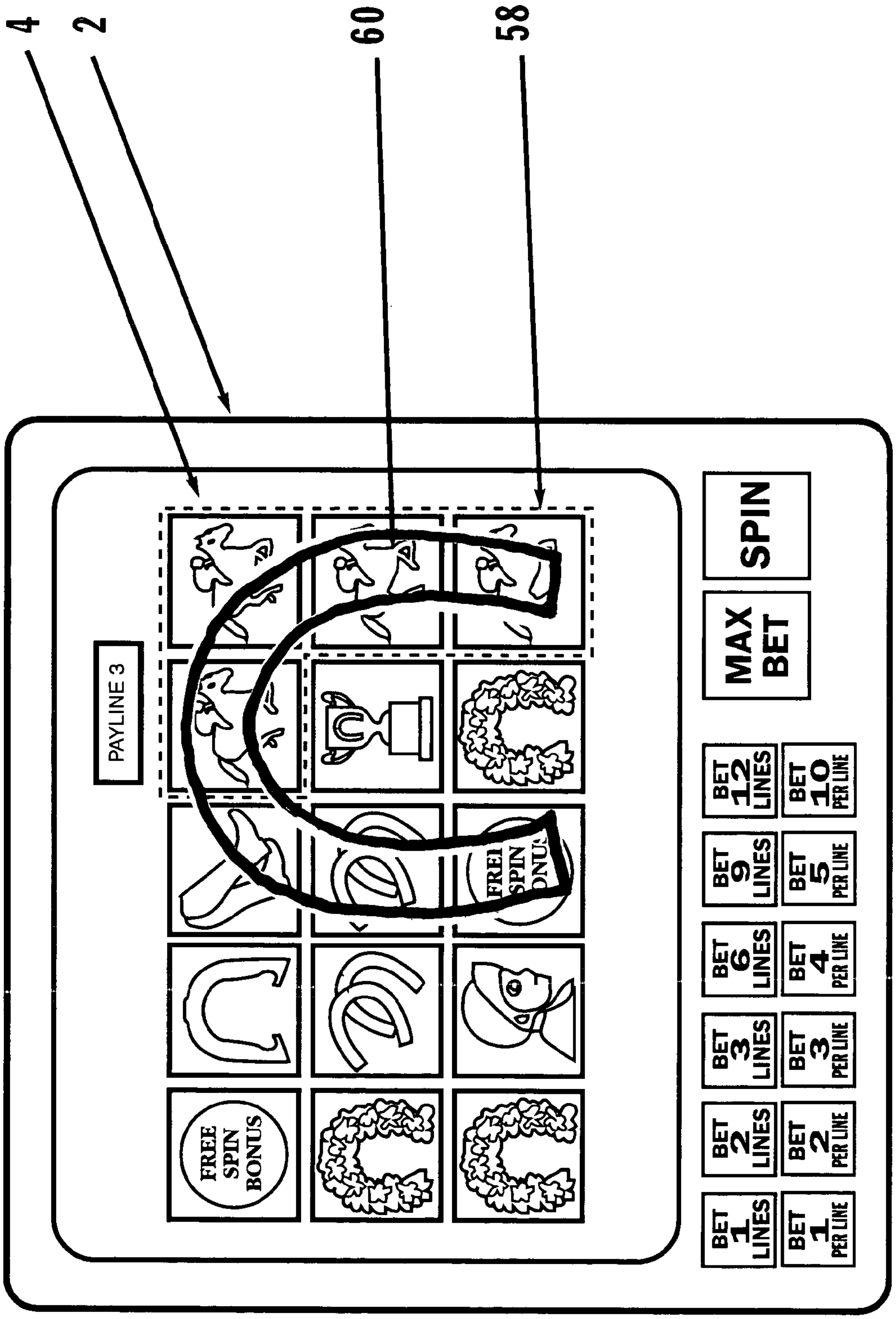
FIG. 6 shows the display screen of video gaming equipment with a winning pay line highlighted with a horseshoe.

FIG. 6 shows the display screen 4 of video gaming equipment 2 with a winning pay line 58 also highlighted with a horseshoe 60.

Figure 7:
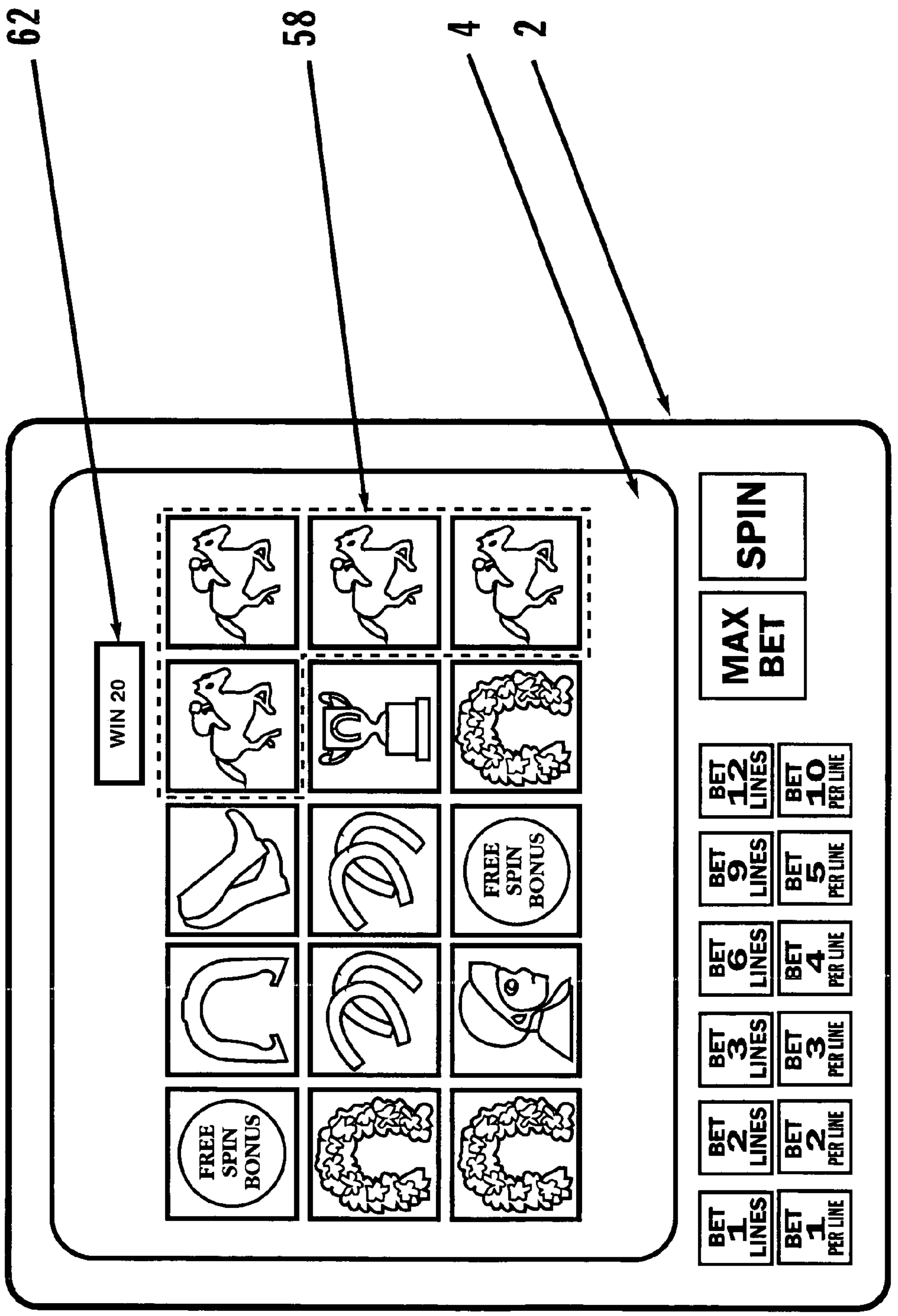
FIG. 7 shows the display screen of video gaming equipment with win amounts displayed and the winning combination highlighted.

FIG. 7 shows the display screen 4 of video gaming equipment 2 with win amounts 62 displayed and the winning combination 58 highlighted.

Figure 8:
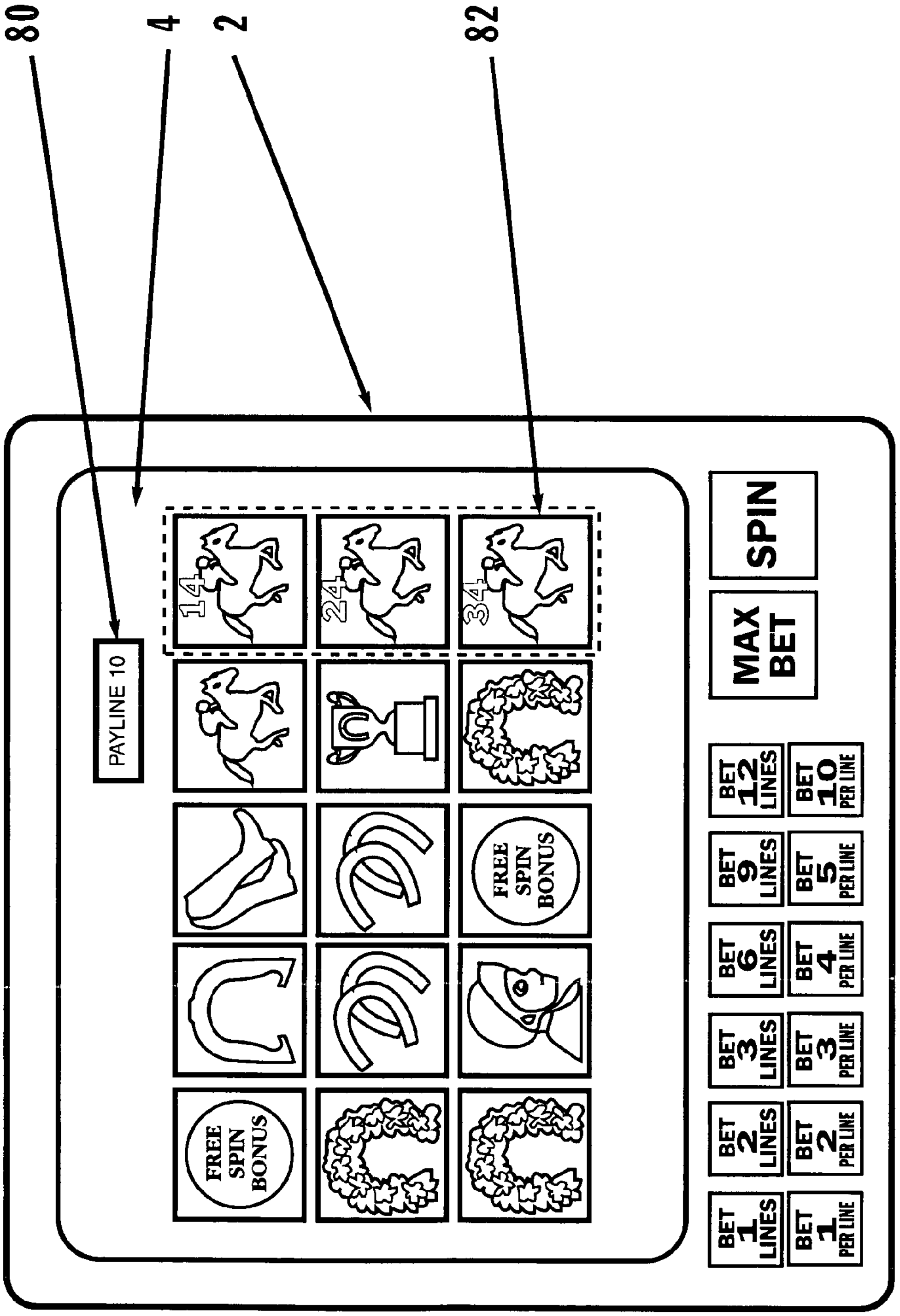
FIG. 8 shows the display screen of video gaming equipment with a second pay line evaluated for wins and a winning arrangement highlighted.

FIG. 8 shows the display screen 4 of video gaming equipment 2 with a second pay line 80 evaluated for wins and a winning arrangement 82 highlighted.

Figure 9:
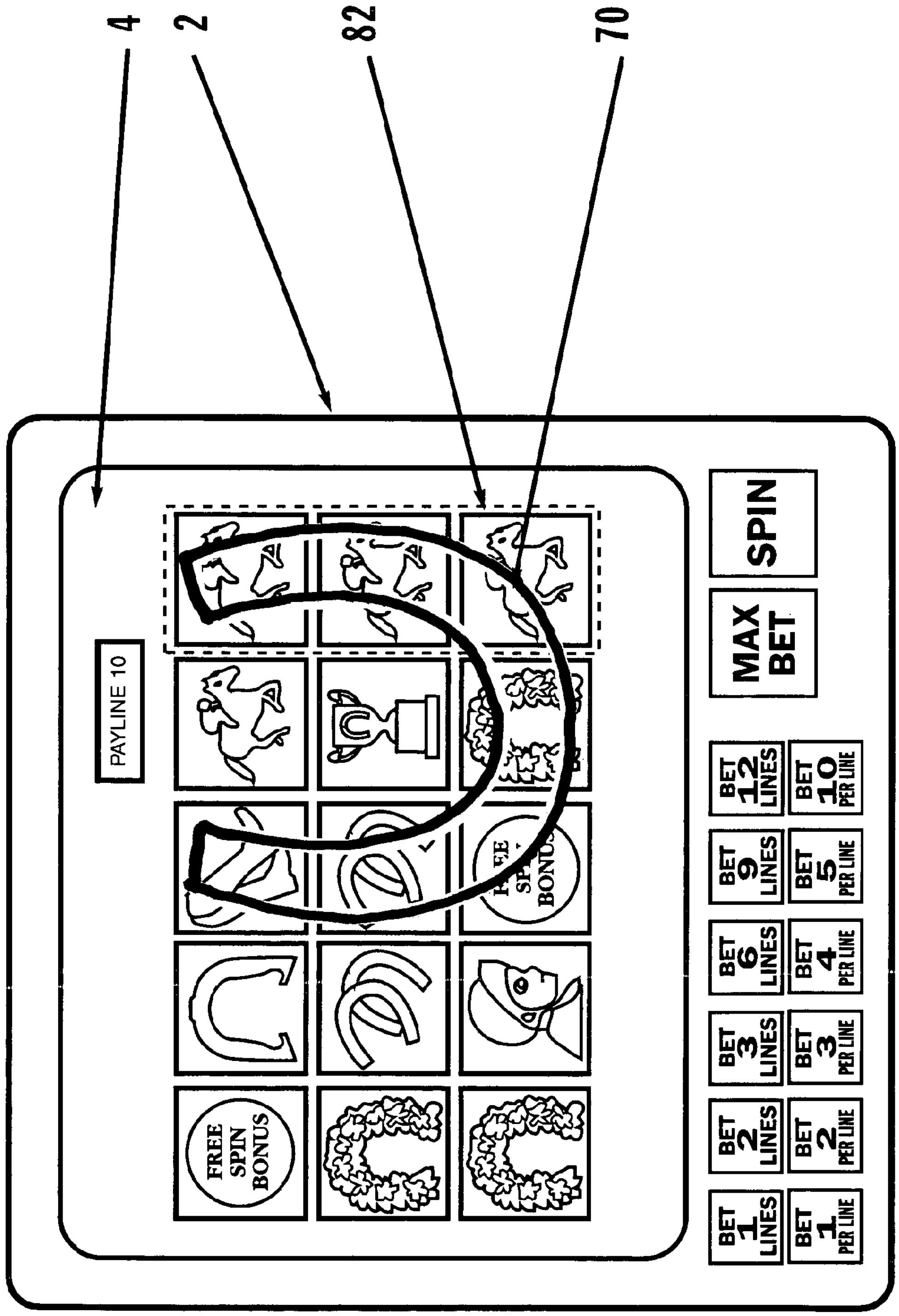
FIG. 9 shows the display screen of video gaming equipment highlighting the 5 winning pay line of FIG. 8 with a horseshoe.

FIG. 9 shows the display screen 4 of video gaming equipment 2 highlighting the 10 winning arrangement 82 of FIG. 8 with a horseshoe 70.

Figure 10:
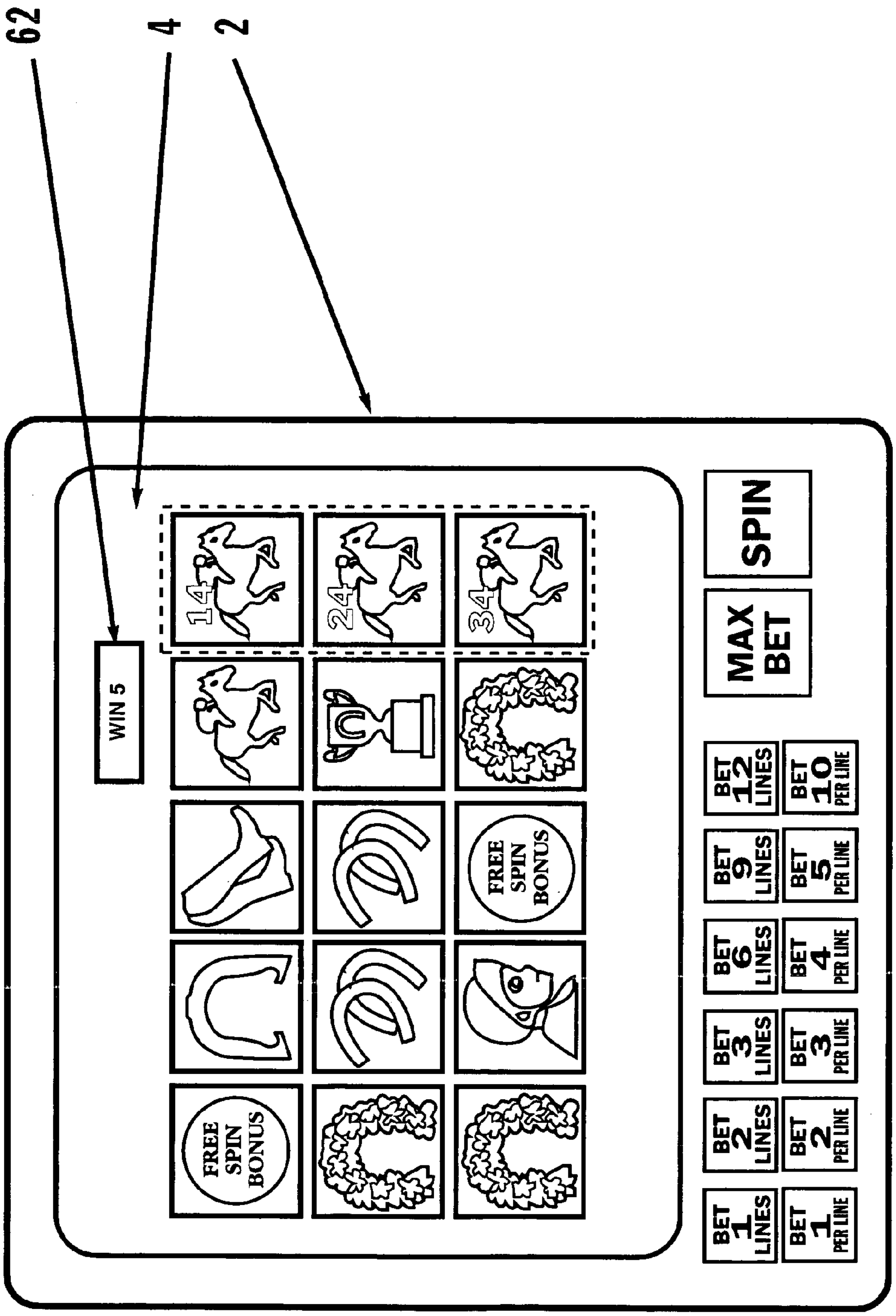
FIG. 10 shows the display screen of video gaming equipment with the win amount for the combination that is highlighted on the screen.

FIG. 10 shows the display screen 4 of video gaming equipment 2 with the win amount 62 for the combination 14, 24 and 34 that is highlighted on the screen 4.

Figure 11:
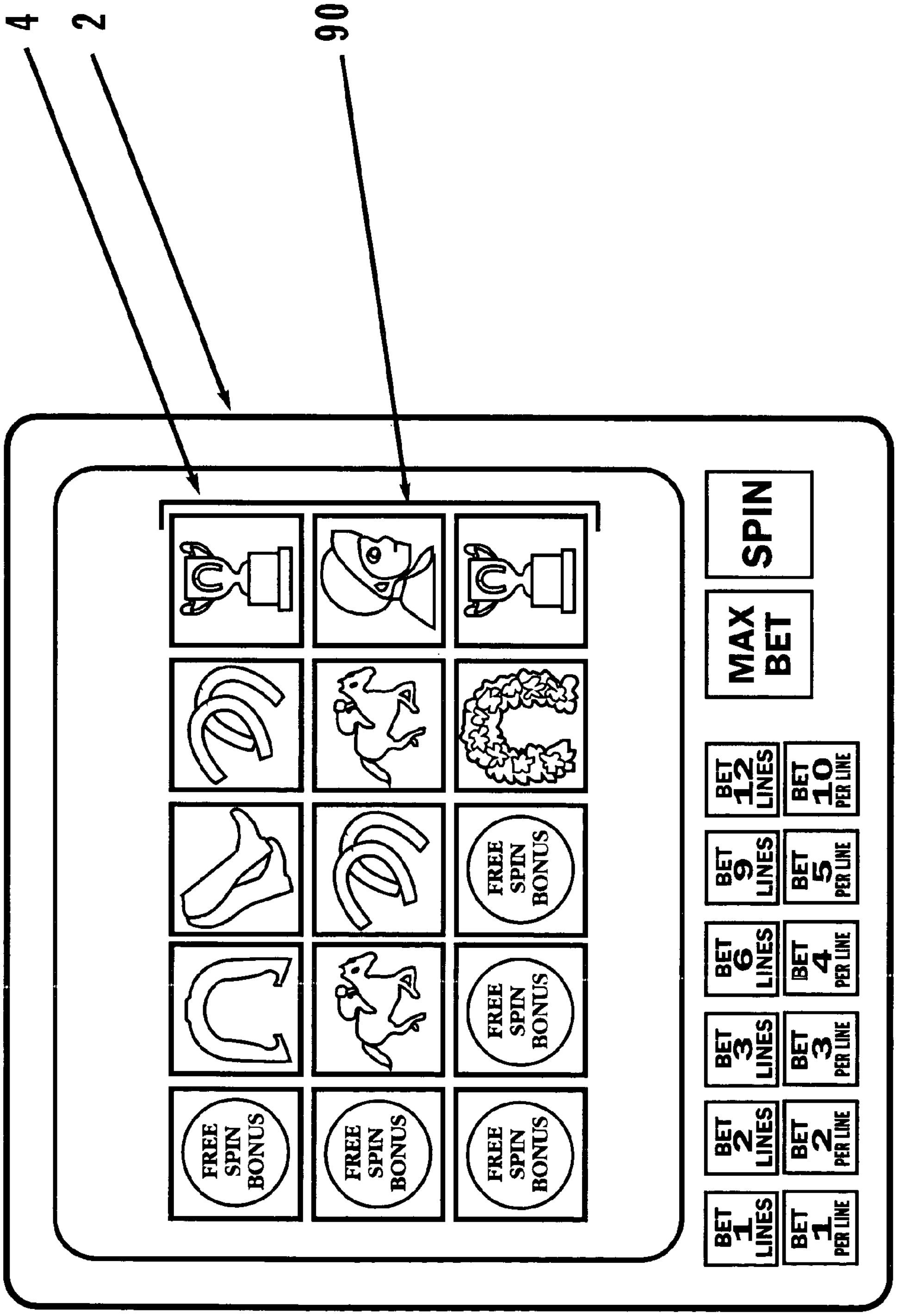
FIG. 11 shows the display screen of video gaming equipment with a second new screen arrangement displayed after a virtual spin.

FIG. 11 shows the display screen 4 of video gaming equipment 2 with a second, new screen arrangement 90 displayed after a virtual spin.

Figure 12:
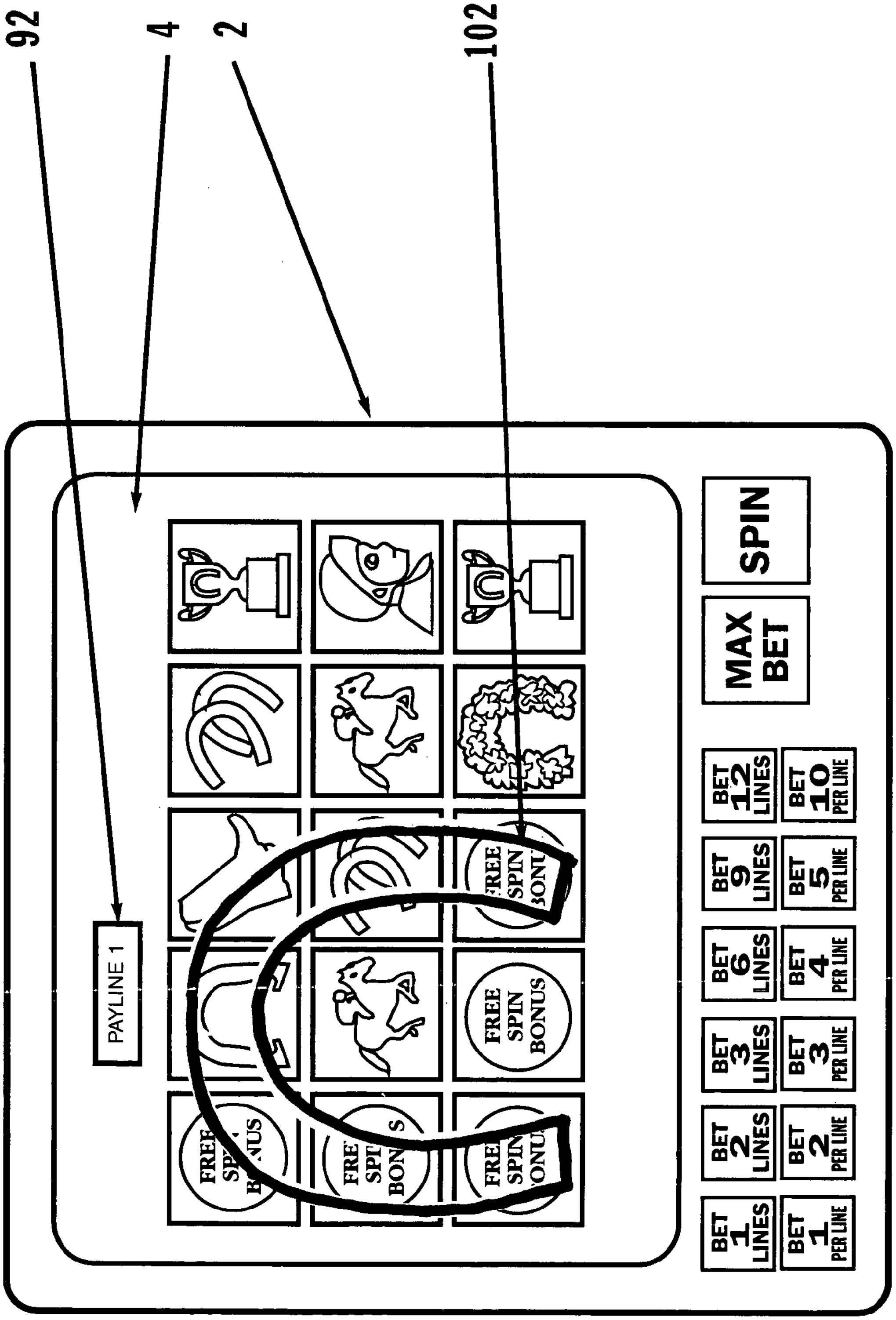
FIG. 12 shows the display screen of video gaming equipment highlighting the winning pay line of FIG. 11 with a horseshoe.

FIG. 12 shows the display screen 4 of video gaming equipment 2 highlighting the winning pay line 92 of FIG. 11 with a horseshoe 102.

Figure 13:
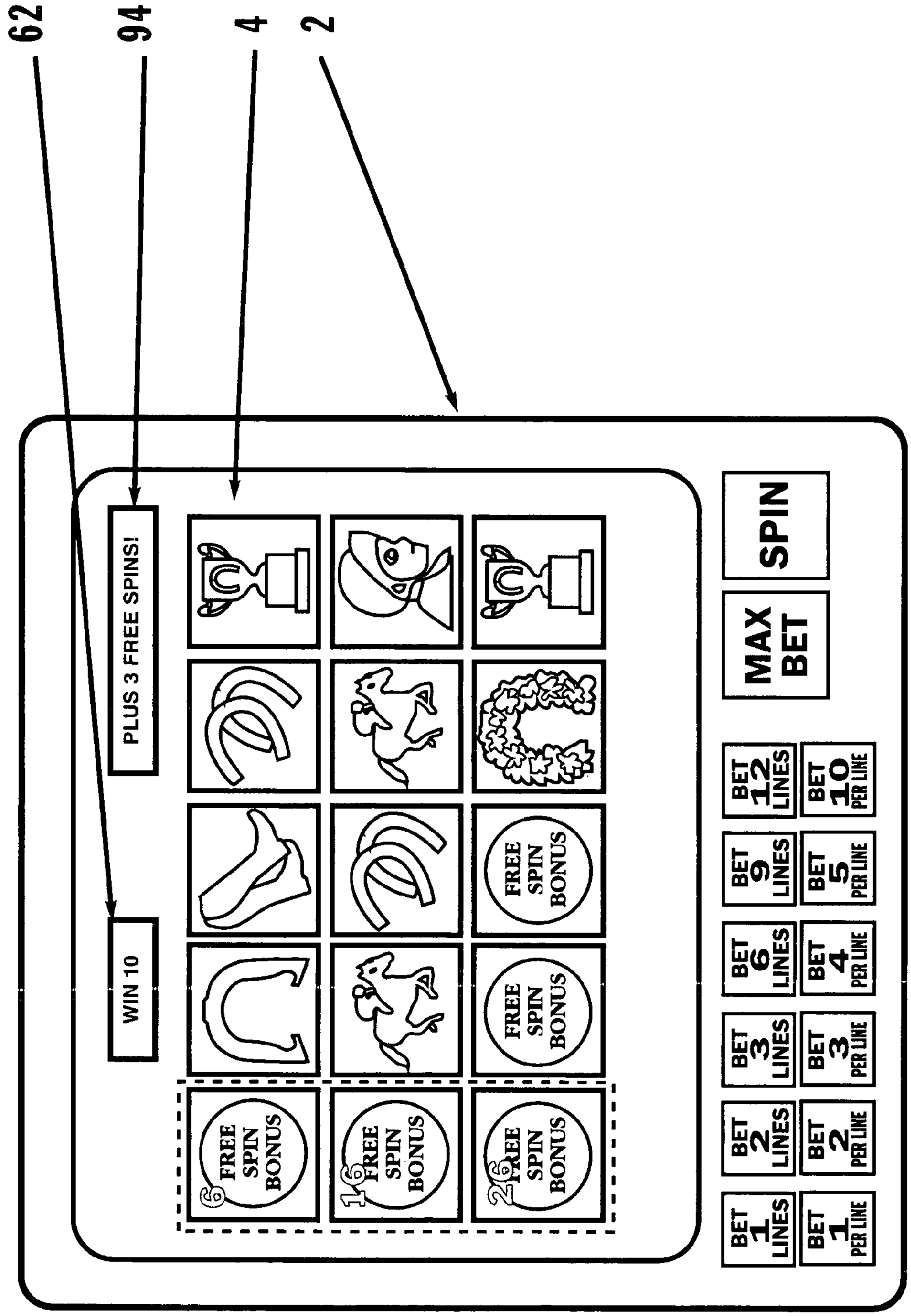
FIG. 13 shows the display screen of video gaming equipment highlighting the winning pay line of FIG. 11 and displaying both an amount of the win and a number of free spins won.

FIG. 13 shows the display screen 4 of video gaming equipment 2 with win amounts 62 for the combination 6, 16, 26 of FIG. 11 displayed along with a free spin display 94.

Figure 14:
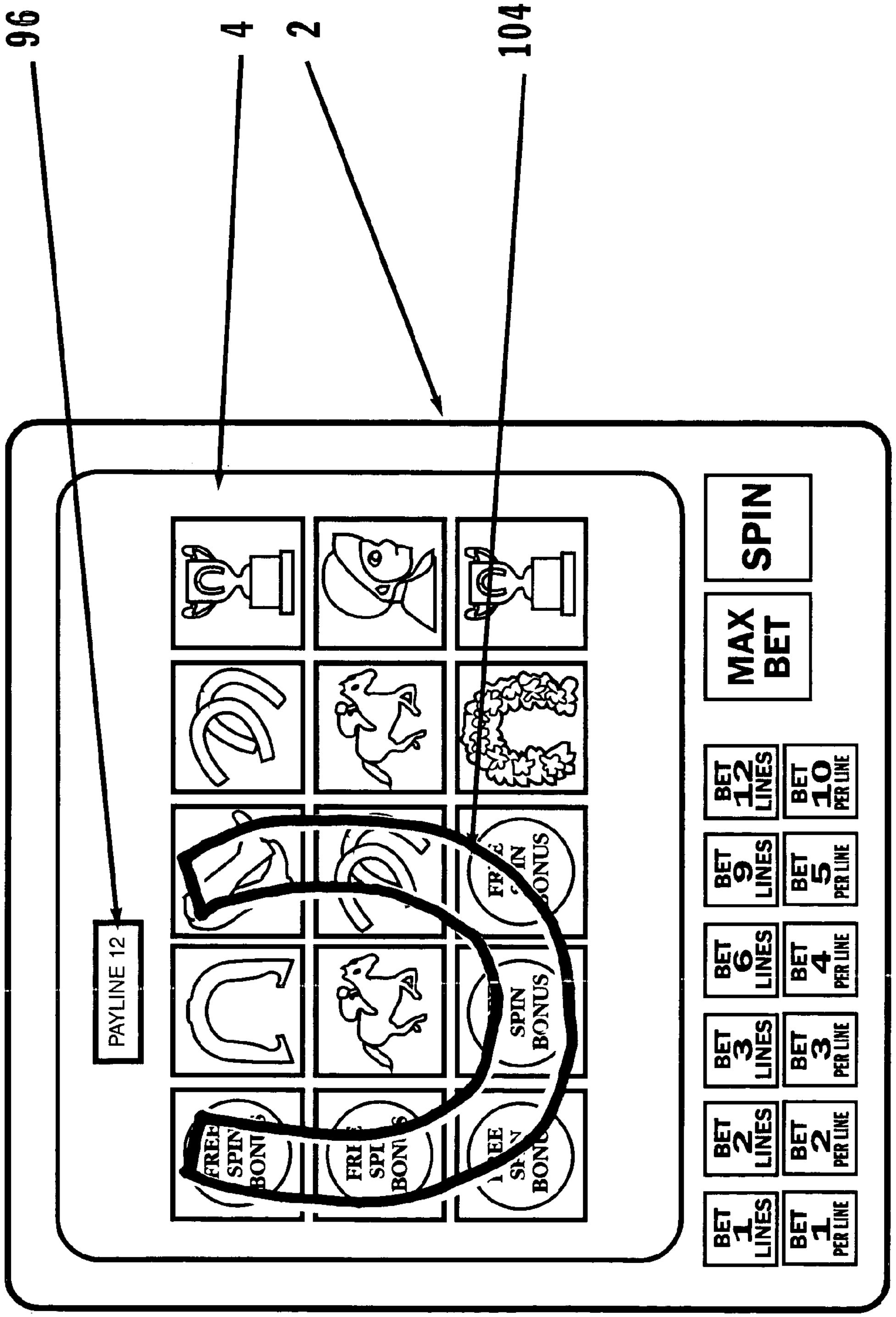
FIG. 14 shows the display screen of video gaming equipment highlighting a another winning pay line of FIG. 11 with a horseshoe.

FIG. 14 shows the display screen 4 of video gaming equipment 2 highlighting a second winning pay line 96 of FIG. 11 with a horseshoe 104.

Figure 15:
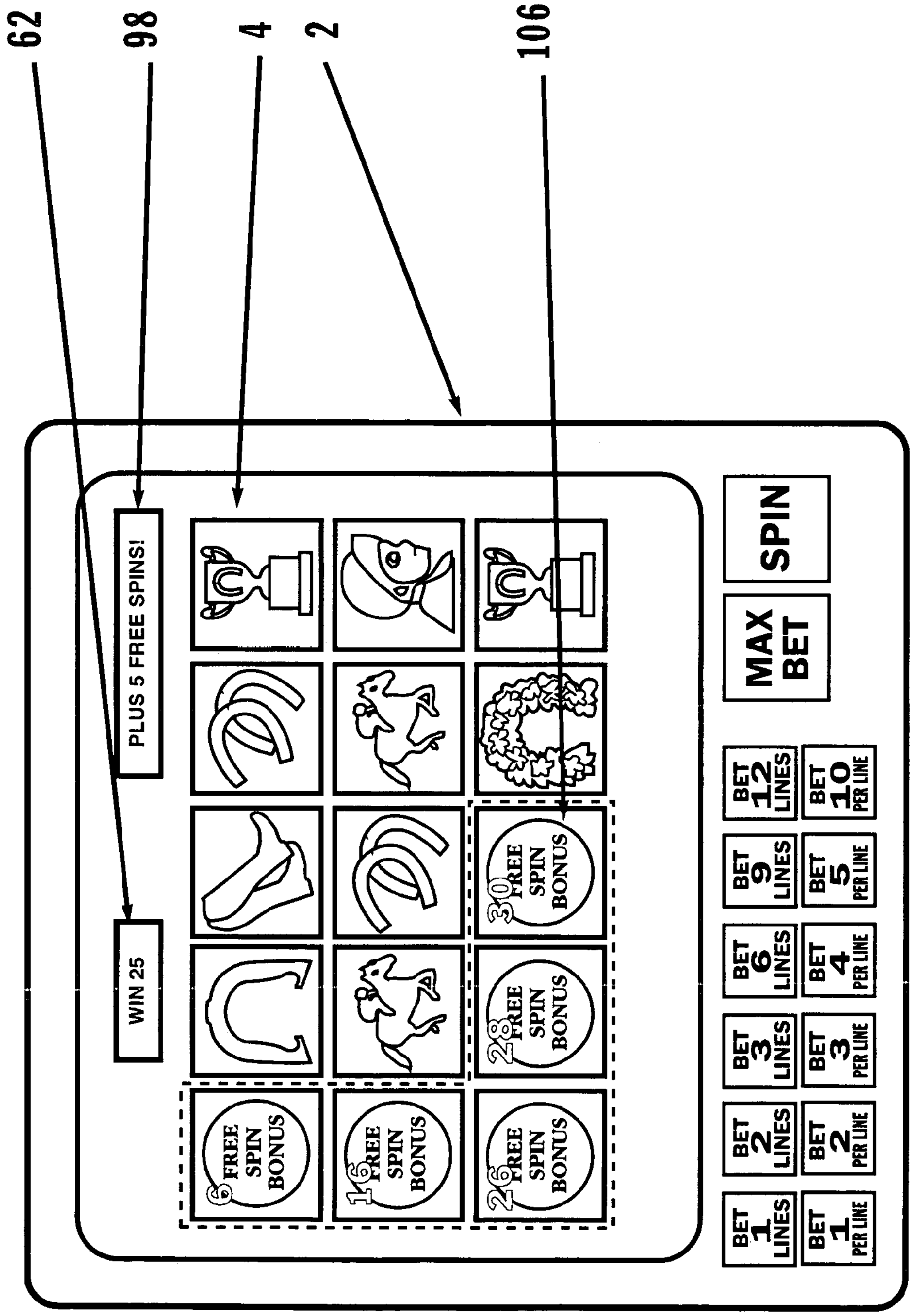
FIG. 15 shows the display screen of video gaming equipment highlighting the winning pay line of FIG. 14 and displaying both an amount of the win and a number of free spins won.

FIG. 15 shows the display screen 4 of video gaming equipment 2 highlighting a winning combination 6, 16, 26, 28, 30 and highlighted arrangement 106 of FIG. 14 and displaying both an amount of the win 62 and a number of free spins won 98.

Figure 16:
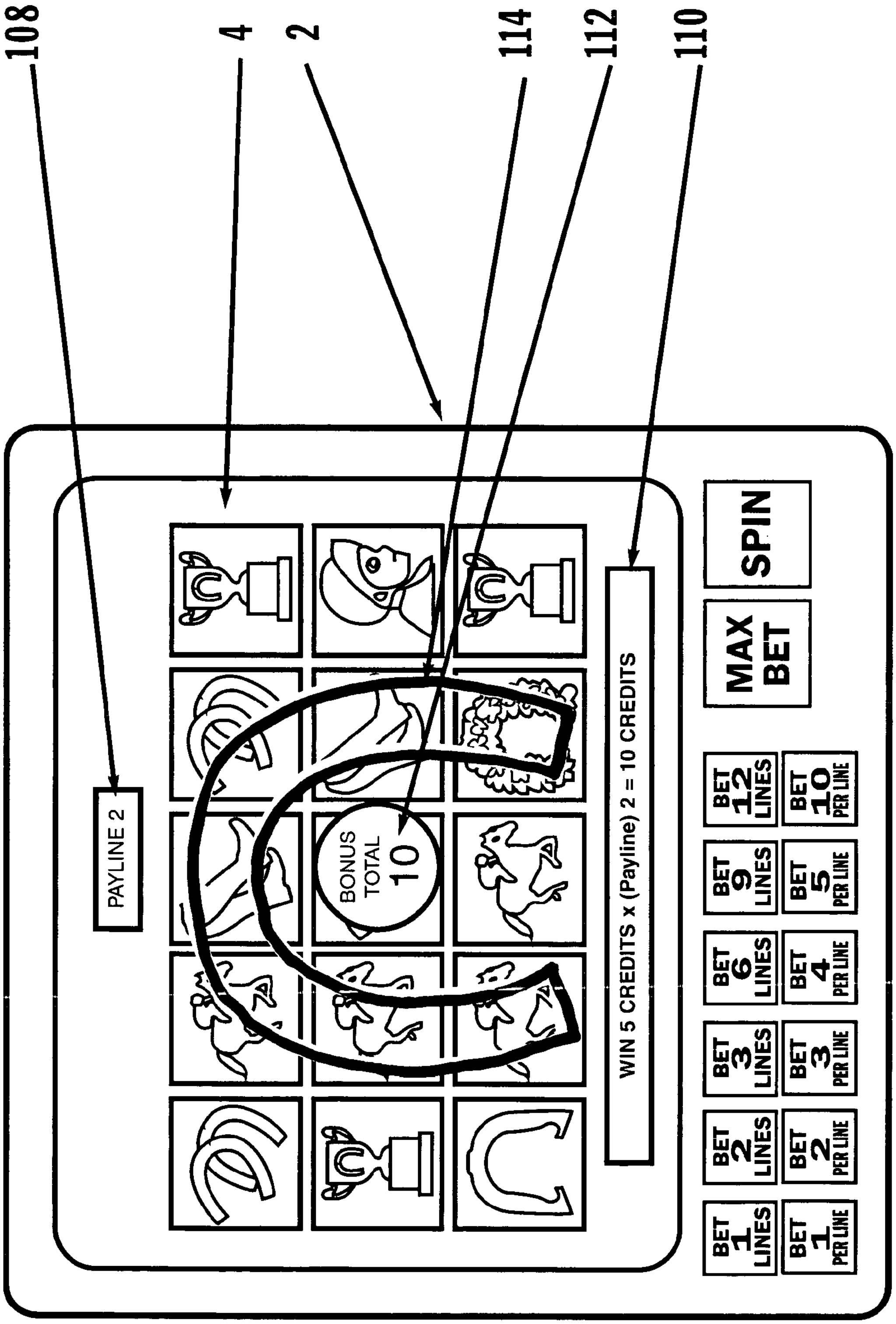
FIG. 16 shows the display screen of video gaming equipment highlighting the first winning pay line of a free spin, the winning pay line being highlighted with a horseshoe, the bonus won for that pay line, and the bonus total so far for the free spin.
Figure 17:
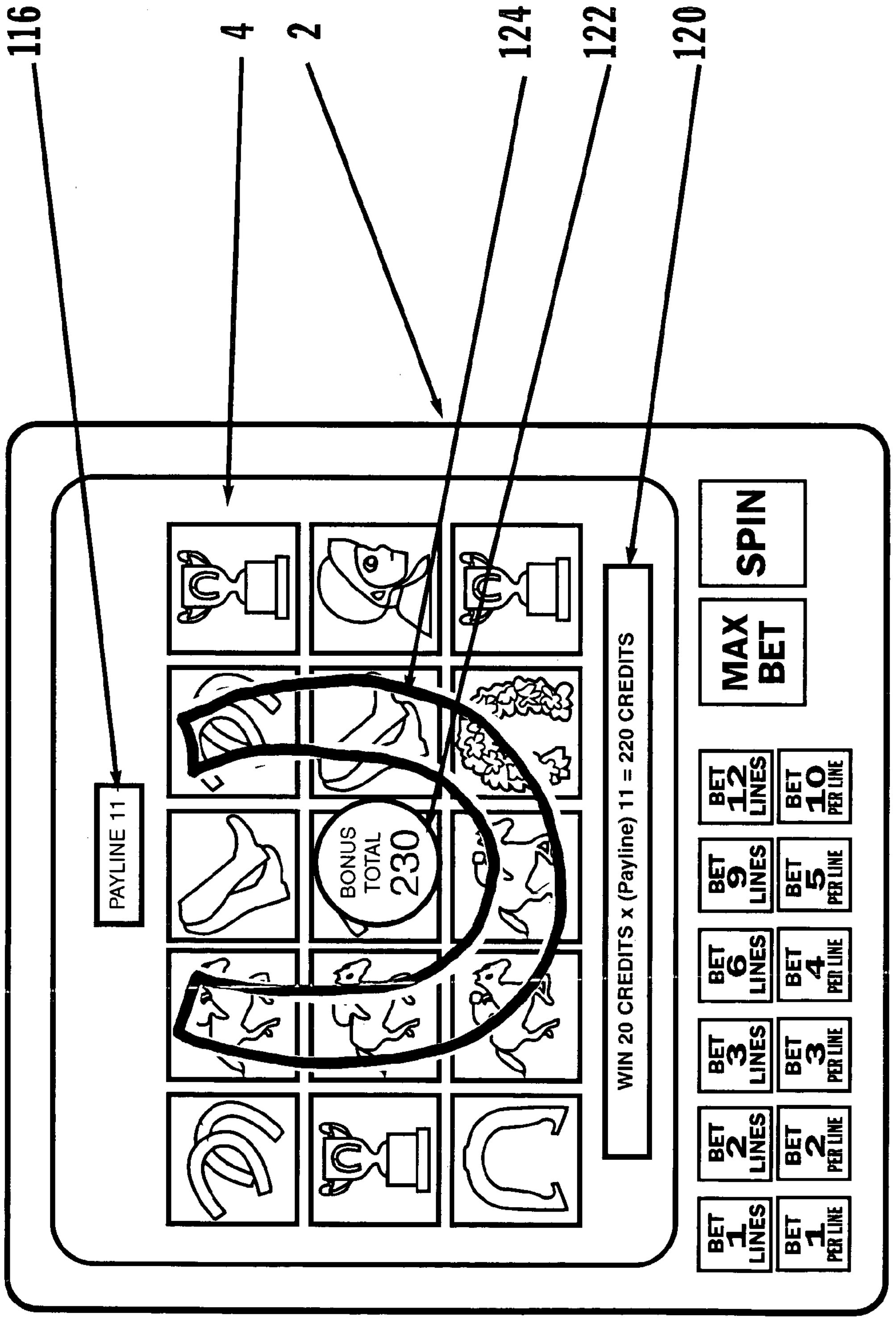
FIG. 17 shows the display screen of video gaming equipment highlighting the second winning pay line of a free spin the winning pay line being highlighted with a horseshoe, the bonus won for that pay line, and the final bonus total for the free spin.

FIG. 16 shows the display screen 4 of video gaming equipment 2 highlighting the first winning pay line 108 of a free spin being highlighted with a horseshoe 114, a bonus amount 110 won for pay line 108, and the bonus win total so far in the game 112 FIG. 17 shows the display screen 4 of video gaming equipment 2 highlighting the second winning pay line 116 with a horseshoe 124, a bonus amount 120 won for pay line 116, the winning bonus total 122 for both pay lines 108 and 116. A wagering system of the invention may provide symbols and predetermined arrangements of symbols that are used to determine wins or losses along pay lines. The system should have at least one pay line of seven frames aligned with three sets of three frames in each set, wherein one set is connected perpendicularly to two sets, and those two sets are parallel to each other. The terms perpendicular and parallel are relative terms and not precise mathematical terms. For example, the sets may be wavy or arcuate rather than straight lines, so exact geometric or mathematical perpendicularity or parallelism is not achieved. Only when the columns and rows are in a pure matrix array of vertical and horizontal square or rectangular frames would precise geometric perpendicular and parallel relationships be established.

Although many specific examples have been provided in the description of the invention, there are options, alternatives and equivalents that have been and will be recognized by those skilled in the art with respect to elements of the practice of the invention and it is the intent of this description to include those elements within the scope of the invention as described and claimed. For example, scatter pay symbols may also be used with the pay lines of the invention, bonus events may be used with the practice of the invention on the same display, mechanically attached display, or separate video screen.

The invention is claimed as follows:

1. A gaming system comprising:

at least one display device configured to display a plurality of frames arranged in a plurality of columns and a plurality of rows;

at least one input device;

at least one processor; and at least one memory device storing a plurality of instructions, which when executed by the at least one processor, cause the at least one processor to operate with the at least one display device and the at least one input device to:

(a) receive a wager on one or more paylines from a player, said paylines including a designated number of designated paylines, said designated number of designated paylines being at least one, each designated payline including a first set, second set and third set of frames, wherein for each of said designated paylines:

(i) the first set, second set and third set each include at least three adjacent frames;

(ii) the first set is parallel to the second set;

(iii) the third set is perpendicular to the first set and the second set;

(iv) the third set includes at least one of the frames of the first set and at least one of the frames of the second set;

(v) at least two of the frames included in said designated payline are located in a same one of the columns; and (vi) at least two of the frames included in said designated payline are located in a same one of the rows;

(b) generate and display a plurality of symbols in a plurality of the frames;

(c) determine any winning symbol combinations on the wagered on paylines; and (d) display an award for any determined winning symbol combinations.

2. The gaming system of claim 1, wherein the at least one display device includes a video display device.

3. The gaming system of claim 1, wherein the at least one display device includes a mechanical display device.

4. The gaming system of claim 1, wherein the frames included in the designated paylines are not included in each of the columns.

5. The gaming system of claim 1, wherein the designated number of designated paylines is three and said designated paylines are overlapping.

6. The gaming system of claim 1, wherein the at least one display device includes a plurality of video display devices and a plurality of the frames are each individually displayed by a separate one of the video display devices.

7. The gaming system of claim 1, wherein the at least one display device includes a plurality of mechanical display devices, wherein a plurality of the frames are each individually displayed by a separate one of the mechanical display devices.

8. The gaming system of claim 1, wherein the plurality of instructions, when executed by the at least one processor, cause the at least one processor to determine a plurality of winning symbol combinations on each of the designated paylines.

9. The gaming system of claim 1, wherein the designated paylines are in the shape of at least one of the symbols.

10. The gaming system of claim 1, wherein the designated number of designated paylines is twelve, and the plurality of instructions, when executed by the at least one processor, cause the at least one processor to operate with the at least one display device and the at least one input device to receive from the player a selection of one of a plurality of different numbers of the designated paylines to wager on and said different numbers are selected from the group consisting of 1, 3, 6, 9 and 12.

11. The gaming system of claim 1, wherein the at least one processor is programmed to operate with the at least one display device to generate and display the frames arranged in a 3×5 array.

12. The gaming system of claim 1, wherein the designated paylines each include seven frames.

13. The gaming system of claim 12, wherein the designated paylines include at least one H-shaped payline.

14. The gaming system of claim 12, wherein the designated paylines include at least one U-shaped payline.

15. The gaming system of claim 1, wherein the designated paylines include at least one H-shaped payline.

16. The gaming system of claim 1, wherein the designated paylines include at least one U-shaped payline.

17. The gaming system of claim 1, wherein the designated paylines include a plurality of H-shaped paylines.

18. The gaming system of claim 1, wherein the designated paylines include a plurality of U-shaped paylines.

19. The gaming system of claim 1, wherein the designated paylines include at least three U-shaped shaped overlapping paylines.

20. The gaming system of claim 1, wherein each of said paylines is associated with a number, and the plurality of instructions, when executed by the at least one processor, cause the at least one processor to operate with the at least one display device to: generate and display a plurality of the symbols in the plurality of the frames and determine if there are any winning symbol combinations on the wagered on paylines, wherein any award displayed for any determined winning symbol combinations is multiplied by the number associated with any wagered on payline that includes any of the winning symbol combinations.

21. The gaming system of claim 1, wherein the designated number of designated paylines is one.

22. The gaming system of claim 1, wherein the designated number of designated paylines is more than one.

23. The gaming system of claim 1, wherein said at least one display device and said at least one input device reside in a housing.

24. The gaming system of claim 1, wherein the at least one processor resides remote from a housing.

25. A method of operating a gaming system, said method comprising:

(a) causing at least one processor to operate with at least one display device to display a plurality of frames arranged in a plurality of columns and a plurality of rows;

(b) causing the at least one processor to operate with at least one input device to receive a wager on one or more paylines from a player, said paylines including a designated number of designated paylines, said designated number of designated paylines being at least one, each designated payline including a first set, second set and third set of frames, wherein for each of said designated paylines:

(i) the first set, second set and third set each include at least three adjacent frames;

(ii) the first set is parallel to the second set;

(iii) the third set is perpendicular to the first set and the second set;

(iv) the third set includes at least one of the frames of the first set and at least one of the frames of the second set;

(v) at least two of the frames included in said designated payline are located in a same one of the columns; and (vi) at least two of the frames included in said designated payline are located in a same one of the rows;

(c) causing the at least one processor to operate with the at least one display device to generate and display a plurality of symbols in a plurality of the frames;

(d) causing the at least one processor to determine any winning symbol combinations on the wagered on paylines; and (e) causing the at least one processor to operate with the at least one display device to display an award for any determined winning symbol combinations.

26. The method of claim 25, wherein the frames included in the designated paylines are not included in each of the columns.

27. The method of claim 25, wherein the designated number of designated paylines is three and said designated paylines are overlapping.

28. The method of claim 25, which includes causing the at least one processor to operate with a separate video display device to individually display each a plurality of the frames.

29. The method of claim 25, which includes causing the at least one processor to operate with a separate mechanical display device to individually display each of a plurality of the frames.

30. The method of claim 25, which includes causing the at least one processor to determine a plurality of winning symbol combinations on each of the designated paylines.

31. The method of claim 25, wherein the designated paylines are in the shape of at least one of the symbols.

32. The method of claim 25, wherein the designated number of designated paylines is twelve, and which includes causing the at least one processor to operate with the at least one input device to receive from the player a selection of one of a plurality of different numbers of the designated paylines to wager on and said different numbers are selected from the group consisting of 1, 3, 6, 9 and 12.

33. The method of claim 25, which includes causing the at least one processor to operate with the at least one display device to generate and display the frames arranged in a 3×5 array.

34. The method of claim 25, wherein the designated paylines each include seven frames.

35. The method of claim 34, wherein the designated paylines include at least one H-shaped payline.

36. The method of claim 34, wherein the designated paylines include at least one U-shaped payline.

37. The method of claim 25, wherein the designated paylines include at least one H-shaped payline.

38. The method of claim 25, wherein the designated paylines include at least one U-shaped payline.

39. The method of claim 25, wherein the designated paylines include a plurality of H-shaped paylines.

40. The method of claim 25, wherein the designated paylines include a plurality of U-shaped paylines.

41. The method of claim 25, wherein the designated paylines include at least three U-shaped shaped overlapping paylines.

42. The method of claim 25, wherein each of said paylines is associated with a number, and which includes causing the at least one processor to operate with the at least one display device to generate and display a plurality of the symbols in the plurality of the frames and determine if there are any winning symbol combinations on the wagered on paylines, wherein any award displayed for any determined winning symbol combinations is multiplied by the number associated with any wagered on payline that includes any of the winning symbol combinations.

43. The method of claim 25, wherein the designated number of designated paylines is one.

44. The method of claim 25, wherein the designated number of designated paylines is more than one.

* * * * *

UNITED STATES PATENT AND TRADEMARK OFFICE

CERTIFICATE OF CORRECTION

PATENT NO. : 8,100,751 B2
APPLICATION NO. : 12/019414
DATED : January 24, 2012
INVENTOR(S) : Kathleen Nylund Jackson It is certified that error appears in the above-identified patent and that said Letters Patent is hereby corrected as shown below:

IN THE CLAIMS:

In column 7, line 30, Claim 9, before “shape” replace “the” with --a--.

In column 8, line 56, Claim 28, after “each” add --of--.

In column 8, line 65, Claim 31, before “shape” replace “the” with --a--.

In column 10, line 4, Claim 41, after “U-shaped” delete “shaped”.

Signed and Sealed this
Tenth Day of April, 2012

David J. Kappos
*Director of the United States Patent and Trademark Office*